(12) United States Patent
Frey et al.

(10) Patent No.: US 6,241,211 B1
(45) Date of Patent: Jun. 5, 2001

(54) PLATE VALVE

(75) Inventors: Heinz Frey, Menziken; Kamil Prochazka, Windisch; Franz Suter, Gebenstorf, all of (CH)

(73) Assignee: ABB Alstom Power (Schweiz) AG, Baden (CH)

(*) Notice: Subject to any disclaimer, the term of this patent is extended or adjusted under 35 U.S.C. 154(b) by 0 days.

(21) Appl. No.: 09/480,851

(22) Filed: Jan. 11, 2000

(30) Foreign Application Priority Data

Jan. 14, 1999 (EP) .................................................. 99810023

(51) Int. Cl.⁷ .............................. F16K 31/12; F16K 25/00
(52) U.S. Cl. ................................ 251/33; 251/43; 251/44; 251/175
(58) Field of Search ............................ 251/44, 158, 172, 251/45, 175, 43, 33; 91/38

(56) References Cited

FOREIGN PATENT DOCUMENTS

| 0631056A1 | 12/1994 | (EP) . |
| 2 284 813 | 4/1976 | (FR) . |
| 2123531A | 2/1984 | (GB) . |

*Primary Examiner*—Joseph A. Kaufman
*Assistant Examiner*—D A Bonderer
(74) *Attorney, Agent, or Firm*—Burns, Doane, Swecker & Mathis, L.L.P.

(57) ABSTRACT

The invention relates to a plate valve (1) as used for the actuator of a control valve. It comprises an inlet (2) with a sealing seat (3) around which the openings of the outlet (7) are arranged, and it has two plates (4), (5), between which there is an interspace (13). Both plates (4), (5) are attached to the housing (11) by springs (6) in a spring space (12). The spring space (12) is operatively connected to a proportional valve by an opening (14) and a line (9). If the pressure in the spring space (12) is lowered by the proportional valve, the additional plate (5) first of all drops as a result and thereby exposes the outflow openings (10) in the large plate (4). There is a slight flow of the oil from the inlet (2) through the orifice plates (8) situated in the plate (4) and through the outflow openings (10) to the openings of the outlet (7). In a second stage, the plate (4) then drops and thereby exposes the openings of the outlet (7). The plate valve (1) is open and the oil can flow unhindered from the inlet (2) to the outlet (7). The plate valve (1) is suitable for an actuator, the control valve of which is to have a short closing time since it has good dynamic characteristics by virtue of its configuration with two plates (4), (5).

4 Claims, 1 Drawing Sheet

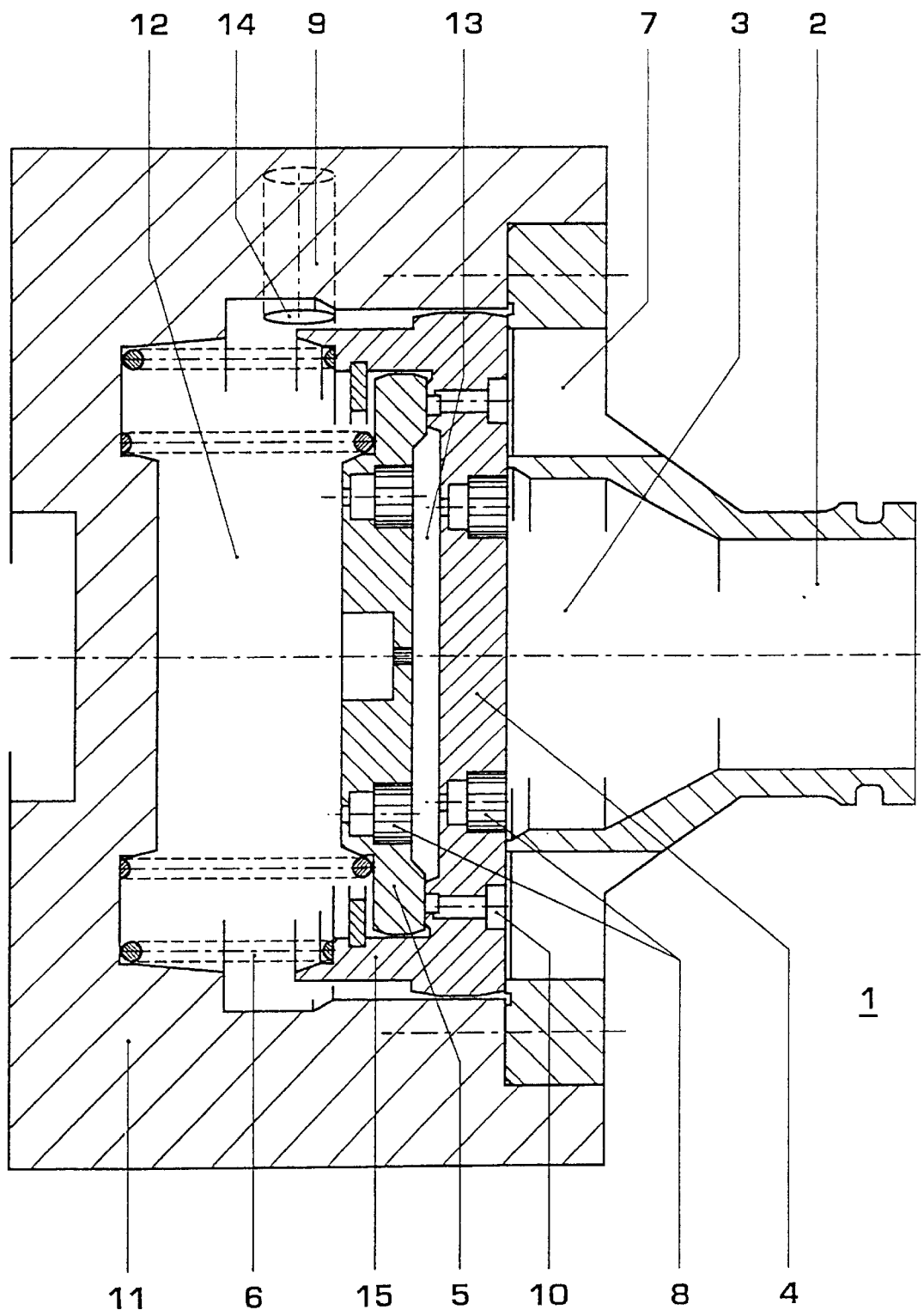

PLATE VALVE

BACKGROUND OF THE INVENTION

1. Field of the Invention

The invention relates to a plate valve.

2. Description of the Related Art

EP 0 631 0 56 has disclosed a plate valve for an actuator of a control valve. The plate valve has an upper opening in which there is oil. The upper opening, which is connected to a driving volume, leads in the centre of the valve to a plate which is mounted on a spring and which separates the driving volume from a spring space. The end of the upper opening forms a cylindrically formed sealing seat. The spring space below the plate is operatively connected to a proportional valve by an opening and a line. If the pressure in the spring space below the plate is lowered by means of the proportional valve, the plate drops due to the higher pressure of the oil in the upper opening above the plate. This frees the path for the oil, which can flow from the upper opening, past the plate, through openings which are distributed over the circumference, around the cylindrically formed sealing head. In this position, the plate valve is open. To prevent the oil from escaping laterally from the plate to the spring space, there is a sealing part between the rim of the plate and the housing. The plate valve is closed again by increasing the pressure below the plate by means of the proportional valve. The relative difference in pressure raises the plate again and thereby prevents the oil from flowing from the upper opening to the openings arranged around the circumference of the sealing seat. There is then a flow of oil from the spring space to the upper opening through orifice plates situated in the plate.

An important factor in the design of a plate valve is the sealing area ratio $\lambda_1 = A_2/A_1$, $A_2$ being the lower area of action and $A_1$ the upper area of action of the plate on which the pressure can act. It essentially determines the dynamic characteristics of a plate valve. A small sealing area ratio $\lambda_1$ means that the valve has a better dynamic response but brings with it the disadvantage that it increases the diameter of the plate and hence of the entire valve. The plate valve described in EP 0 631 056 has this disadvantage. Particularly when designing a plate valve for an actuator of a control valve which must be closed very quickly in the event of an emergency shutdown of the plant, an actuator plate valve designed in this way has a very large diameter and, as a result, is very expensive to manufacture.

SUMMARY OF THE INVENTION

The invention achieves the object of designing a plate valve which is configured for a very rapid dynamic response. However, the plate valve should nevertheless have a small diameter to avoid the high cost of manufacturing a valve with a large diameter.

According to the invention, the object is achieved by virtue of the fact that the plate valve has an additional plate, this additional plate being situated below the plate, on the side facing away from the inlet and facing the spring space, the additional plate having orifice plates and there being outflow openings in the plate below the outlet.

The plate valve according to the invention has the advantage that, despite a comparatively small diameter, it has good dynamic characteristics. The additional plate, which has a smaller sealing area ratio $\lambda_1$ and hence a better dynamic response than the plate, assists the plate during the opening of the valve. The additional plate acts as an intensifier for this plate. In this way, a rapid dynamic response of the valve is achieved without the need to increase the diameter of the valve in order to obtain a smaller sealing area ratio $\lambda_1$.

The further possible refinements are the subject matter of the dependent patent claims.

BRIEF DESCRIPTION OF THE DRAWING

The single FIGURE shows a section through an embodiment of a plate valve according to the invention.

Only those elements that are essential to the invention are shown.

DETAILED DESCRIPTION OF THE INVENTION

The single FIGURE shows schematically an embodiment of a plate valve 1 according to the invention in the closed state, as used in an actuator for a control valve. The housing 11 has an inlet 2 which is connected to a driving volume (not shown) for the control valve. The inlet 2 ends in a sealing seat 3, which is of cylindrical design and adjoins a plate 4. In the plate 4 there are orifice plates 8 below the inlet 2 and the sealing seat 3. The orifice plates 8 are of relatively small diameter. The openings of the outlet 7 are distributed around the circumference of the sealing seat 3 of the inlet 2. In the plate 4 there are outflow openings 10 below the openings of the outlet 7. These outflow openings 10 have a larger diameter than the orifice plates 8 and a smaller diameter than the openings of the outlet 7. An additional plate 5 is arranged on the side of the plate 4 facing away from the inlet 2. In the closed state, this additional plate 5 closes the outflow openings 10 in the plate 4 with its outer rim. An interspace 13 is formed centrally between the plate 4 and the additional plate 5, approximately below the inlet 2. In the additional plate 5, as in plate 4, there are below the inlet 2 orifice plates 8 connected to the interspace 13. The additional plate 5 is bounded laterally by extensions 15 on the underneath of the plate 4. On the side of the additional plate 5 facing away from the interspace 13 there is a spring space 12, into which the extensions 15 on plate 4 also project. Both plates 4, 5 are secured on the opposite side of the housing 11 by springs 6. The springs 6 are attached to the extension 15 of the plate 4 and to the outer rim of the additional plate 5. In a second embodiment (not shown), the spring 6 of the additional plate 5 is attached to the extensions 15 of the plate 4. The spring space 12 is connected to a commercially available proportional valve (not shown) by an opening 14 and a line 9.

The single FIGURE shows the plate valve 1 in the closed state. The inlet 2 contains oil at a particular pressure $p_1$. To open the plate valve, the pressure $p_2$ in the spring space 12 is reduced abruptly in relation to the pressure $p_1$ prevailing in the inlet 2 by means of the proportional valve (not shown), it being necessary to include the sealing area ratio $\lambda_1$ in the pressure reduction $\Delta p_1 = \lambda_1 * p_2 - p_1$. This results in a slight flow from the inlet 2, through the orifice plates 8 of the plate 4, through the interspace 13 and on through the orifice plates 8 of the additional plate 5, into the spring space 12. As a result of the reduction in the pressure $p_2$ in the spring space 12, the additional plate 5 initially drops. Once the additional plate 5 has dropped, the outflow openings 10 in the plate 4, which were previously covered by the rim of the additional plate 5, are exposed. Since the diameter of the outflow openings 10 is greater than the diameter of the orifice plates in the additional plate 5, there is a slight flow from the inlet 2, through the orifice plates 8 of the plate 4 and on via the outflow openings 10 in the plate 4, to the outlet 7. At this stage, the interspace 13 has been somewhat enlarged by the downward movement of the additional plate 5. The pressure in the interspace 13 is now reduced by the flow of the oil through the outflow openings 10. Between the inlet 2 and the interspace 13 there arises a pressure difference which leads to the lowering of the plate 4 and hence to the exposure of the outlet 7 by the plate 4. The oil can now flow unhindered from the inlet 2 to the openings of the outlet 7 since the diameter of the openings at the outlet 7 is very much greater than the diameter of the orifice plates 8. The plate valve 1 is now open. Since the time taken for the plate valve to open is in the millisecond range, the intermediate states described are to be regarded only as the reference points of an idealized opening process.

To close the plate valve 1, the pressure P2 in the spring space 12 is increased again by means of the proportional valve (not shown). A positive difference $\Delta p_1 = \lambda_1 * p_2 - p_1$ between the pressure Pi of the inlet 2 and the pressure P2 in the spring space 12 causes the additional plate 5 and, simultaneously, the plate 4 to rise. The plate 4 covers the outlet 7 with its outflow openings 10, and the additional plate 5, in turn, closes the said outflow openings with its outer rim. The plate valve 1 is closed. Flow can now take place from the spring space 12, through the orifice plates 8 and the interspace 13, to the inlet 2.

The additional plate 5 acts like an intensifier for the plate 4. This significantly improves the dynamic characteristics of the plate valve 1 even though the sealing area ratio $\lambda_1$ of the plate 4 is relatively large and its diameter is relatively small. The sealing area ratio $\lambda_1$ of the additional plate 5 is smaller than the plate 4 and it is therefore more dynamic. The improved dynamic characteristics of the plate valve 1 according to the invention make it particularly suitable where there is a requirement to design an actuator for a control valve for applications where the control valve must be closed very rapidly in the event of an emergency shutdown. Its small diameter avoids the expensive design of a prior-art plate valve of very large diameter while having the same dynamic characteristics.

What is claimed is:

1. A plate valve, comprising:

a housing, at least one inlet, at least one outlet, a spring space and a plate in which there are orifice plates, wherein the plate valve having an additional plate, the additional plate being situated below the plate, on a side facing away from the inlet and facing the spring space, the additional plate having orifice plates, and there are outflow openings in the plate below the outlet.

2. The plate valve according to claim 1, wherein there is an interspace between the plate and the additional plate.

3. The plate valve according to claim 2, wherein the plate and the additional plate are each secured on the housing on the side of the plates, facing away from the inlet by at least one spring which is situated in the spring space.

4. The plate valve according to claim 3, wherein the plate and the additional plate are each secured on the housing on the side of the plates, facing away from the inlet by two springs, which are situated in the spring space.

* * * * *